June 1, 1965 — M. C. FIELDS ETAL — 3,186,795
METHOD OF RECOVERING AMMONIA
Filed Oct. 31, 1961
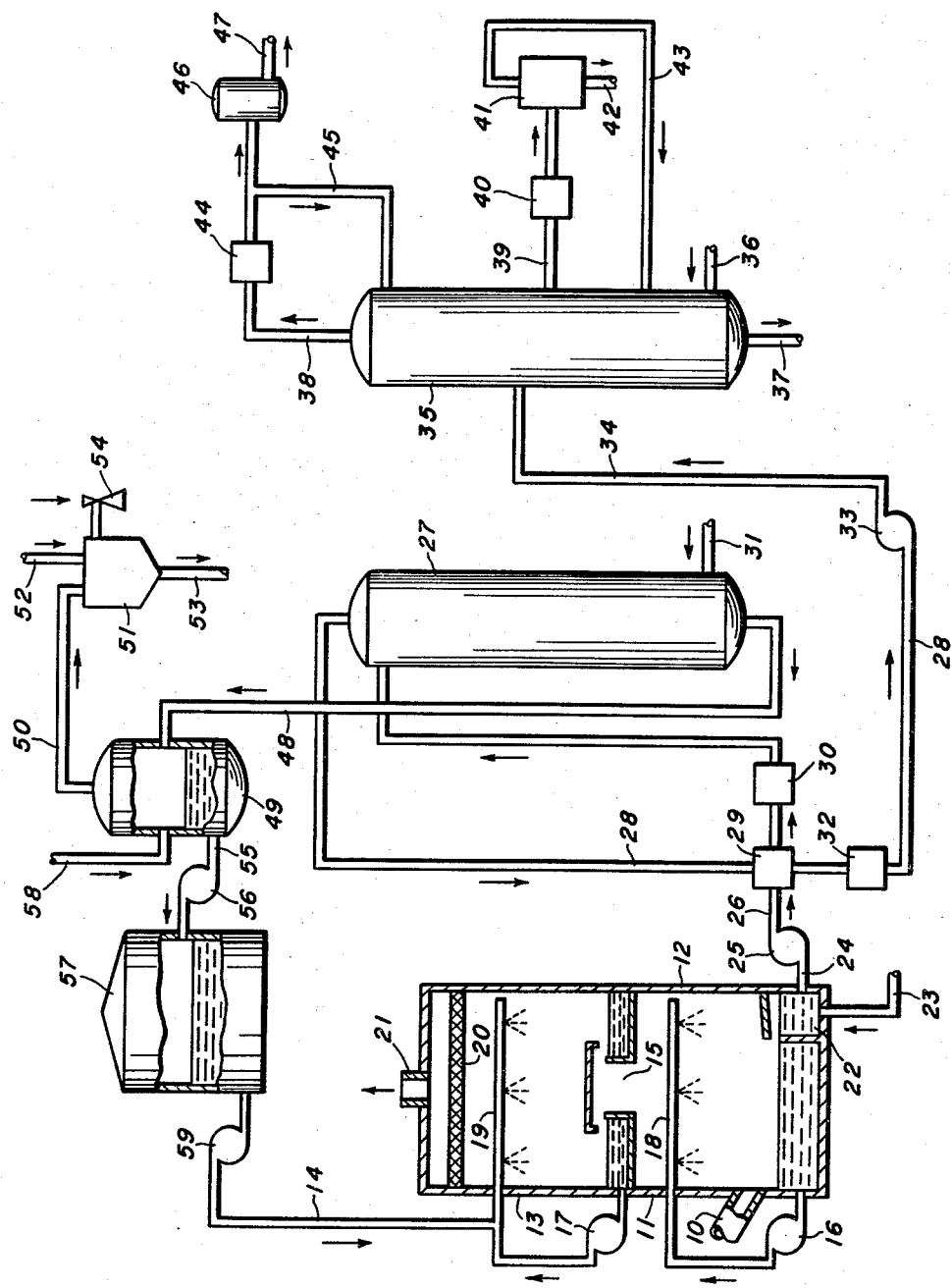
INVENTORS.
MARVIN C. FIELDS and
ROBERT D. RICE
By Donald G. Dalton
Attorney 3,186,795
METHOD OF RECOVERING AMMONIA
Marvin C. Fields and Robert D. Rice, Monroeville, Pa., assignors to United States Steel Corporation, a corporation of New Jersey
Filed Oct. 31, 1961, Ser. No. 149,111
9 Claims. (Cl. 23—196)

This invention relates to the recovery of ammonia, especially from coke-oven gases. In particular, it involves a method using phosphate solutions for absorbing ammonia and then stripping ammonia therefrom while under a high pressure, e.g., in excess of about 100 p.s.i.a.

Processes for recovering ammonia from a gas stream whereby the ammonia is absorbed into a solution of ammonia, phosphoric acid and water and subsequently stripped therefrom, are known. In these processes the stripped, lean or regenerated absorbing solution has a molar ratio, or mole ratio of $NH_3$ to $H_3PO_4$ below 1.5. After absorption of ammonia from a gas, the rich solution has a mole ratio above 1.5, before stripping out the absorbed ammonia to regenerate a lean solution.

The absorption and stripping steps are separate and may be conducted at different pressures. In general, the absorption will be conducted at the available pressure of the gas. The stripping pressure may be atmospheric, somewhat below or above atmospheric. The ordinary engineering implications of elevated pressures in stripping and other distillation operations would point to the avoidance of pressures much above atmospheric, except when the temperature of the available cooling water is too high for condensing the overhead product and it would require refrigeration to do so at normal pressures. Also, that the equilibria and the thermodynamics of distillation and stripping processes usually become less favorable as the pressure and the corresponding temperature are raised. Then too, corrosivity tests with ammonium phosphate solutions indicate that carbon steels are unsuitable as engineering materials for a stripper operated even at atmospheric pressure. This is especially true for lean solutions which become progressively more acidic as the mole ratio of $NH_3$ to $H_3PO_4$ is decreased below 1.5. The austenitic stainless steels such as AISI Types 304 and 316 exhibit satisfactory resistance to corrosion attack by lean solutions at their boiling temperatures only at atmospheric and moderately elevated pressures. Their corrosion rates increase disproportionately at pressures above 90 p.s.i.a., and discourage stripping at such pressures as uneconomic.

Despite what would be expected from these tests, we have discovered that, above a certain critical pressure, the corrosion rate is not excessive. We have found, when our cyclic process is utilized to remove ammonia from coke-oven gases, that the corrosion rates of these and other stainless steels at pressures above 100 p.s.i.a. are unexpectedly moderate and acceptable. We have found, moreover, that, at pressures above 100 p.s.i.a., the stripping operation produces a richer, purer aqua ammonia, and a leaner, more acidic stripped absorbing solution, with a smaller consumption of stripping steam or heat. These effects allow further equipment and operating economies throughout the cyclic absorption and stripping process and in the fractionation of the aqua ammonia to produce substantially anhydrous ammonia.

A complete understanding of the invention may be obtained from the following detailed description and explanation which refer to the accompanying drawing illustrating the present preferred practice. The single figure of the drawing is a diagrammatic representation of a system for carrying out the method of our invention.

Referring now in detail to the drawing, coke-oven gases are introduced by a pipe 10 to the bottom stage 11 of an absorber 12. The gases ascend through bottom stage 11 and top stage 13 counter-current to descending sprays of absorbing solution supplied by a pipe 14 to top stage 13. The solution overflows therefrom through a riser 15 to the bottom stage 11. Absorbing solution is recirculated in each stage by pumps 16, 17 to spray headers 18, 19 in stages 11 and 13 respectively, to provide dense sprays throughout each spray zone. The absorbing solution is composed of ammonia, phosphoric acid, and water, and it will be evident that the mole ratio of $NH_3$ to $H_3PO_4$ is lowest in the pipe 14, higher in the upper stage 13, and still higher in the lower stage 11. The term "lean solution," for the purpose of describing our invention is applied to the leanest solution supplied through pipe 14, and the term "rich solution" is used for the richest solution produced by the successive absorption steps. In the practice of our invention, lean solution will have a mole ratio less than about 1.5 and rich solution will have a mole ratio greater than 1.5. The mole ratio of $NH_3$ to $H_3PO_4$ in the solution, together with the temperature and water concentration, determine the content of ammonia in the solution and its capacity for absorbing more ammonia.

The coke-oven gases pass through an entrainment separator 20 and leave the absorber through a pipe 21, substantially free of ammonia. The solution, enriched in ammonia, overflows from the bottom stage 11 into a chamber 22 for contact with vapor distilled from ammoniacal liquor in an ammonia still (not shown). The distillation of ammoniacal liquors produced in coke plants is conventional. The vapor is conducted through a pipe 23, after being compressed if necessary, and introduced into chamber 22 below the level of the solution therein. A portion of the ammonia-still vapor condenses and is absorbed into the solution, further enriching it in ammonia and heating it to its boiling point. The uncondensed portion of the ammonia-still vapor escapes from the chamber and ascends with the coke-oven gases through the absorber.

From chamber 22 the rich solution passes through a pipe 24 to a pump 25 which pumps it through a pipe 26 at a pressure in excess of 100 p.s.i.a to a stripping column 27. The solution is first heated by the stripper overhead from pipe 28 in heat exchanger 29 and then to its boiling point in heat exchanger 30. In the column 27, the solution descends countercurrent to a stream of vapor generated at the bottom, and is stripped of its absorbed ammonia thereby. The stripping vapor may be generated by the direct injection of steam through a pipe 31 or by indirect heating in a reboiler (not shown) or by a combination of these means.

The aqua ammonia comprising desorbed ammonia and water vapor, leaves the top of the stripper through a pipe 28. The mixture is partially condensed and cooled in a heat exchanger 29 and fully condensed in a heat exchanger 32. A pump 33 then pumps it through a pipe 34 at a pressure in excess of 150 p.s.i.a. to a fractionating column 35, where it descends countercurrent to a stream of vapor rising from the bottom, generated by supplying steam from a pipe 36. From the fractionator 35, the bottom fraction leaving through a pipe 37 is substantially water, whereas the overhead fraction in pipe 38 is substantially anhydrous ammonia. Neutral and basic oils, absorbed from the coke-oven gases tend to accumulate in the central region of the fractionator. They may be drawn off through a pipe 39 as a vapor side-stream, condensed in a heat exchanger 40 and decanted in a decanter 41. Alternatively a liquid side-stream may be drawn off and the oils decanted in a decanter 41. The oil layer is removed through a pipe 42 and the ammonia-water layer is returned through a pipe 43 to the column. The anhydrous ammonia in pipe 38 is condensed in a heat exchanger 44, a portion being returned to column 35 through a pipe 45 as reflux, the remainder flowing to an activated-carbon absorber 46 to remove any remaining oils and then through a pipe 47 to storage as refrigeration-grade ammonia.

The hot, lean regenerated solution flows from the base of stripping column 27 through a pipe 48 to a vacuum-flash evaporator 49 to remove excess water through a pipe 50 as a vapor, containing only a negligible amount of ammonia. The water vapor is condensed in a direct condenser 51 by means of water from pipe 52 and is discharged through a barometric pipe 53. The vacuum is sustained by a steam-jet ejector 54. The evaporatively cooled solution in evaporator 49 may have its water content adjusted from a water pipe 58 by means of a specific-gravity controller (not shown). It then flows from the evaporator through a pipe 55 and pump 56 to a storage tank 57. Any phosphate-ion make-up to compensate for solution leaks and entrainment may be added to storage tank 57 in the form of phosphoric acid or an ammonium-phosphate salt. The lean solution is pumped at a controlled rate by pump 59 through line 14 to the absorber 12 to repeat the cycle.

It will be apparent that absorber 12, chamber 22, columns 27 and 35, the heat exchangers and other hereinabove-described equipment may be of any design known to effect the desired results. In particular, the absorber, stripping column and fractionating column are multistage gas-liquid contactors, such as packed, plate or spray towers. Preferably, the absorber is a two- or three-stage spray tower and the stripping and fractionating columns are bubble-cap or perforated tray towers containing ten or more trays. Chamber 22, which is shown as a simple pot built integrally with absorber 12, may be a separate vessel and may be a packed plate or spray tower as well as a pot. As a separate vessel, chamber 22 may be erected between absorber 12 and pump 25, to enrich the solution by its contact with ammonia-still vapor, the uncondensed portion thereof being conducted through a pipe to the bottom of the absorber.

A specific example of the practice of the invention, giving quantities involved, is set forth below.

In a typical coke-oven plant producing 100,000 s.c.f.m. of coke-oven gas containing 0.8% $NH_3$ by volume, and 114 pounds per minute of ammonia-still vapor containing 10% ammonia by weight, 1200 pounds per minute of a lean solution containing 41% by weight of ammonium phosphate salts is used to absorb the ammonia in a two-stage absorber, as described above. The salts in the lean solution have a mole ratio of $NH_3$ to $H_3PO_4$ of 1.25. The solution enters through pipe 14 at 60° C. The coke-oven gases enter through pipe 10 at 45° C., saturated with water at that temperature and at a pressure somewhat above atmospheric. The solution overflows from the lower stage 11 into chamber 22. The ammonia-still vapor enters chamber 22 through pipe 23 at 99° C. The gas leaves the absorber through pipe 21 containing 0.004% $NH_3$ by volume, corresponding to a 99.6% recovery of the total ammonia in the coke-oven gases and ammonia-still vapors. The rich solution leaves chamber 22 through pipe 24 containing 44% salts and at a mole ratio of 1.95. The rich solution is pumped to a pressure of 200 p.s.i.a. by pump 25, heated to 165° C. by the stripper overhead in heat exchanger 29 and by steam to 180° C. in heat exchanger 30 before entering the 20-plate stripping column 27, operated at 200 p.s.i.a. and supplied from pipe 31 with 220 pounds steam per minute. The hot, lean solution leaves the bottom of the column at 198° C. through pipe 48 containing 39% by weight salts and at a mole ratio of 1.25. The solution is cooled to about 60° C. and concentrated to 41% by weight salts in the flash evaporator 49, which is operated at 180 mm. mercury absolute and supplied with a stream of water through pipe 58 to control its specific gravity. The net amount of water removed is about 12.6 pounds per minute, and the 1200 pounds per minute of cooled, lean solution is pumped to storage tank 57, to be returned to the absorber.

Vapor leaves the top of stripper 27 at 163 pounds per minute, 200 p.s.i.a., 180° C., contains 29% ammonia and the balance water, with traces of organic and inorganic contaminants. The vapor is partially condensed in heat exchanger 29, fully condensed in heat exchanger 32 and pumped at 120° C. and 240 p.s.i.a. to fractionating column 35, supplied at the bottom with 71 pounds per minute of steam from pipe 36. A small, vapor side-stream relatively rich in oils picked up from the coke-oven gases flows from the fractionator through pipe 39 to condenser 40 and decanter 41 for separation of oil and return of the ammonia-water layer through pipe 43 to the column. The water bottoms leaving the fractionator through pipe 37 contain no more than about 0.3 weight percent ammonia. The anhydrous ammonia in pipe 38 containing no more than about 0.01 weight percent water is condensed in condenser 44, a portion being returned as reflux to the fractionator, the remainder being deoiled to less than 3 p.p.m. oils in activated-carbon absorber 46 to yield about 47 pounds per minute of ammonia that meets refrigeration-grade specifications.

While the above example illustrates a preferred method of operation, other conditions of operation may be used without departing from the spirit of the invention. The mole or molar ratio of $NH_3$ to $H_3PO_4$ in the lean solution may be varied from about 1.1 to 1.3 when it is used to absorb ammonia from coke-oven gas at substantially atmospheric pressure in a two-stage absorber. It may be as high as 1.4 or 1.5 in those instances where the gas is available at higher pressure or lower temperature or lower humidity or where local conditions make the use of a three- or four-stage absorber attractive. The rich solution may have a higher or lower mole ratio than 1.95, say from about 1.5 to 2.2, depending upon the ammonia concentration in the gas, the temperature and pressure at which the absorber is operated, the number of stages in the absorber, and the manner of handling the ammonia-still vapors resulting from the distillation of the ammoniacal liquor, which liquor was separated initially from the coke-oven gas.

A high ammonia concentration in the gas, the use of an absorber containing a large number of stages, the operation of the absorber at a high pressure and low temperature, and the separate use of the ammonia-still vapors to enrich the solution in chamber 22, rather than admixing them with the gas ahead of the absorber, all favor the formation of a rich solution having a high mole ratio. The salt concentration of the solution should be below its saturation value and greater than 10%. The saturation value will depend upon the mole ratio and temperature of the solution. Thus, for example, a rich solution having a mole ratio of 1.95 and a lean solution having a mole ratio of 1.25, at an absorber temperature of 40° C., will both have a saturation salt concentration of about 45%. For a process in which ammonium-phosphate slurries are employed, the salt concentration of the slurry would be greater than the saturation value of the solution. Thus in the above example a salt concentration greater than 45%, but less than say 80%, would be employed in a slurry process.

The operating temperature and pressure of the absorber will be largely determined by the temperature and pressure at which the coke-oven gas is available. The operating temperature may be from 30° to 60° C. The operating pressure will usually be a little above atmospheric pressure, although higher pressures, if available, would be preferred. The stripper should be operated at a pressure of at least 100 p.s.i.a., and probably should not be operated at a pressure higher than 300 p.s.i.a. The fractionator may be operated at any pressure high enough to permit the condensation of the desired ammonia product with available cooling water. Normally, for a fractionator producing anhydrous ammonia, this pressure will be between 150 and 300 p.s.i.a.

The concentration of the salts in the absorbing solutions may be controlled by use of a closed-surface reboiler in the stripper and by the evaporation of water into the gas stream by use of a warmer absorbing solution, instead of using the flash evaporator. However, the described vacuum-flash evaporator both cools the lean solution and removes excess water. Consequently, it eliminates the need for a lean-solution cooler and for a closed-surface reboiler in the stripper. By transferring heat between the rich solution and the stripper overhead, the heat content of the lean solution leaving the stripper is preserved for utilization in the flash evaporator. The stripper overhead is condensed prior to fractionation. It will be obvious that with the stripper operating at elevated pressure, the overhead vapor from the stripper may be sent as vapor feed to the fractionator, operating the latter at the same or lower pressure. Introducing the stripper overhead into the fractionator as a vapor rather than as a liquid, would result in a decreased steam consumption for the fractionator, but would require more total condenser surface.

The invention is characterized by several distinct advantages. In the first place, conducting the stripping of rich solutions at pressures between about 100 and 300 p.s.i.a. results in greatly reduced steam or heat consumption. Whereas, the steam rate required to produce a lean solution having a mole ratio of 1.25 increases about 50% when the stripping pressure is reduced from 200 to 100 p.s.i.a., it increases disproportionately as the stripping pressure is reduced to below 100 p.s.i.a. until it is about 15 times the 200 p.s.i.a. rate at atmospheric pressure.

Secondly, stripping in the pressure range 100–300 p.s.i.a. results in a purer, more concentrated aqua ammonia. Whereas, stripping at 200 p.s.i.a. produces 163 pounds per minute of a 29 weight percent ammonia vapor, when stripping at 100 p.s.i.a., 280 pounds per minute of overhead vapor are generated at an ammonia concentration of only 17 weight percent. Again, the vapor generated and the dilution of the ammonia therein increase disproportionately as the stripping pressure is reduced below about 100 p.s.i.a. It is obvious also that fractionation of a greater volume of more dilute aqua ammonia becomes more costly in steam, water, and power consumption and, that the stripping, fractionation and auxiliary equipment would be larger and more costly. This larger quantity of aqua ammonia overhead would contain a larger total quantity of impurities which would adulterate and require removal from the final ammonia product.

Thirdly, stripping at 200 p.s.i.a. makes it economical to produce a lean solution having a mole ratio of 1.25. Such an acidic solution rejects or does not co-absorb acidic gases from the coke-oven gases and permits fractionation of a purer product without need for using neutralizing alkali in the fractionator. At atomspheric or other low stripping pressures, economy dictates stripping to a less acid solution, for example, to one having a mole ratio of 1.4. The desired high removal of ammonia from coke-oven gas is barely possible with this less-acidic solution, and requires an absorber containing many stages, an increased volume of solution circulation and enlargement in the auxiliary equipment in addition to requiring removal of co-absorbed acidic gases.

Finally, the above-described advantages of stripping at pressures from about 100 p.s.i.a. to 300 p.s.i.a., resulting in a purer product and reduced capital and operating costs, may be enjoyed quite unexpectedly when recovering ammonia from coke-oven gases without the excessive and increasing corrosion of stainless-steel equipment, which would have been expected when handling lean solutions that become progressively more acid as the mole ratio is decreased below 1.5. While we do not know what inhibits the corrosion activity of the solutions after cyclically scrubbing coke-oven gases, we have found that their corrosivity to the austenitic stainless steels, such as AISI Types 304 and 316 when stripping at 200 p.s.i.a. to a mole ratio of 1.25 was reduced by about 90% from what was expected in accordance with prior corrosion tests. In these prior tests, the corrosion rate of pure ammonia phosphate solutions increased disproportionately above 90 p.s.i.a. and would have been prohibitive when operating with stripping pressures above 100 p.s.i.a. Although the corrosion rates of stainless steels are greatly reduced in our method, they do increase as the stripping pressure is increased. Hence, the pressure is increased above 200 p.s.i.a., corrosion will increase, as well as the disadvantages associated with the ordinary engineering implications of high pressure equipment. Accordingly, we do not believe it advisable to operate the stripper above about 300 p.s.i.a. In certain instances, the above-described advantages of stripping between about 100 p.s.i.a. and 300 p.s.i.a. may outweigh the cost of corrosion-resistant equipment when recovering ammonia from gases other than coke-oven gases.

Our method is particularly applicable to the economical recovery of ammonia from coke-oven gases and in meeting problems peculiar to coke plants, namely, virtually complete recovery of low-concentration ammonia to prevent equipment corrosion and fouling in subsequent gas-handling operations and in recovering refrigeration-grade ammonia from gases which contain many potential contaminants to this product.

Although we have disclosed herein the preferred practice of our invention, we intend to cover as well any change or modification therein which may be made without departing from the spirit and scope of the invention.

We claim:

1. A method of separating ammonia from coke-oven gases which consists in scrubbing said gases with an aqueous absorbent solution of ammonia and phosphoric acid, whereby substantially all of the ammonia in said gases is absorbed in said solution, then placing the solution under a pressure between about 100 and 300 p.s.i.a., and stripping to thereby recover an ammonia-water product from the enriched solution.

2. A method as defined in claim 1, characterized by placing the ammonia-water product from the stripping column under pressure and fractionating said product, thereby recovering substantially anhydrous ammonia.

3. A method as defined in claim 1, characterized by condensing the ammonia-water product from the stripping column, distilling the condensate in a fractionating column, removing a sidestream containing vapor, condensing the vapor, decanting oils from the condensate and returning the aqueous layer to the fractionating column.

4. A method as defined in claim 1, characterized by condensing the ammonia-water product from the stripping column, distilling the condensate in a fractionating column, removing a liquid sidestream, decanting oils from the same, and returning the aqueous layer to the fractionating column.

5. A method as defined in claim 1, characterized by distilling ammonia from ammoniacal liquor and introducing the resulting ammonia-still vapor into said absorbent solution immediately after said gas-scrubbing step.

6. A method of separating ammonia from coke-oven gases which consists in scrubbing said gases with an aqueous absorbent solution of ammonia and phosphoric acid, whereby substantially all of the ammonia in said gases is absorbed in said solution, introducing ammonia vapor from an external source into said solution immediately following said absorption step, then applying to said solution a pressure of between about 100 and 300 p.s.i.a. and stripping to thereby recover an ammonia-water product therefrom until a stripped absorbent solution is left having a mole ratio of ammonia to phosphoric acid in the range of about 1.1 to 1.3.

7. A method as defined in claim 6 characterized by effecting said solution stripping step in contact with stainless steel.

8. A method as defined in claim 7 characterized by effecting said solution-stripping step under a pressure of about 200 p.s.i.a.

9. A method as defined in claim 1 characterized by fractionating the ammonia-water product from the stripping column, said product containing oils, condensing resulting vapors, returning a portion of the condensate as reflux, passing the remaining condensate containing oils and ammonia through an activated-carbon adsorber to adsorb the oils therefrom, whereby oil-free anhydrous ammonia is recovered.

References Cited by the Examiner

UNITED STATES PATENTS

| | | | |
|---|---|---|---|
| 2,519,451 | 8/50 | Fulton | 202—51 |
| 2,716,631 | 8/55 | Bechtel | 202—68 |
| 2,797,148 | 6/57 | Carlson | 23—196 |
| 2,799,678 | 7/57 | Sweeney | 260—290 |
| 2,849,288 | 8/58 | Langguth | 23—196 |
| 2,899,274 | 8/59 | Smith et al. | 23—196 X |
| 3,024,090 | 3/62 | Rice | 23—196 |
| 3,054,726 | 9/62 | Fields et al. | 202—51 |
| 3,056,657 | 10/62 | Nowak | 23—196 |

GEORGE D. MITCHELL, *Primary Examiner.*